United States Patent [19]
Povenmire et al.

[11] Patent Number: 5,265,243
[45] Date of Patent: Nov. 23, 1993

[54] PROCESSOR INTERFACE CONTROLLER FOR INTERFACING PERIPHERAL DEVICES TO A PROCESSOR

[75] Inventors: Richard M. Povenmire; Jeffrey J. Ogren, both of Mesa, Ariz.

[73] Assignee: Motorola, Inc., Schaumburg, Ill.

[21] Appl. No.: 27,260

[22] Filed: Feb. 22, 1993

Related U.S. Application Data

[63] Continuation of Ser. No. 785,173, Oct. 29, 1991, abandoned, which is a continuation-in-part of Ser. No. 328,920, Mar. 27, 1989, abandoned.

[51] Int. Cl.$^5$ ............................................. G06F 13/00
[52] U.S. Cl. ............................ 395/550; 364/DIG. 1; 364/270.6; 364/271.5; 364/240.9
[58] Field of Search ........................................ 395/550

[56] References Cited

U.S. PATENT DOCUMENTS

| | | | |
|---|---|---|---|
| 3,753,232 | 8/1973 | Sporer | 340/172.5 |
| 4,112,490 | 9/1978 | Pohlman et al. | 364/200 |
| 4,346,440 | 8/1982 | Kyu et al. | 364/200 |
| 4,379,327 | 4/1983 | Tietjen et al. | 340/172.5 |
| 4,484,263 | 11/1984 | Olson et al. | 364/200 |
| 4,535,404 | 8/1985 | Shenk | 364/200 |
| 4,631,659 | 12/1986 | Hayn, II et al. | 364/200 |
| 4,644,463 | 2/1987 | Hotchkin et al. | 364/200 |
| 4,807,109 | 2/1989 | Farrell et al. | 364/200 |
| 4,853,850 | 9/1989 | Krass, Jr. et al. | 364/200 |

OTHER PUBLICATIONS

"Microprocessor Systems Design: 68000 Hardware, software and interfacing", Alan Clements, PWS-Kent Publishing Company, 1987.

*Primary Examiner*—Gareth D. Shaw
*Assistant Examiner*—Kakali Chaki
*Attorney, Agent, or Firm*—Frank J. Bogacz

[57] ABSTRACT

A generic interface controller for a processor to peripheral device interface. This circuit eliminates marginal timing between a processor and a plurality of different peripheral devices while providing read and write operations within a minimum amount of cycle time. The processor interface controller generates read, write and acknowledge signals. This controller is particularly useful for ASIC applications where some of the peripheral devices such as memory, may be co-located on the ASIC circuit while other peripheral devices may be remotely located from the application Specific Integrated Circuit (ASIC) circuit.

17 Claims, 2 Drawing Sheets

PROCESSOR INTERFACE CONTROLLER FOR INTERFACING PERIPHERAL DEVICES TO A PROCESSOR

This application is a continuation of prior application Ser. No. 785,173, filed Oct. 29, 1991, now abandoned, which is a continuation-in-part of prior application Ser. No. 328,920, filed Mar. 27, 1989 now abandoned.

BACKGROUND OF THE INVENTION

The present invention relates to a processor's interface with peripheral devices and more particularly to circuitry for the elimination of marginal timing between a microprocessor and its associated peripheral devices.

It is desirable for microprocessors to achieve a high data transfer rate between itself and its associated peripheral devices. This high data transfer rate provides the highest microprocessor throughput. High microprocessor throughput is desirable since this allows the microprocessor to perform more functions per unit of time.

Peripheral devices may include memories, disk drives, tape drives, internal or external registers. These peripheral devices have markedly different access times for reading and writing under microprocessor control. Typically, a different peripheral device interface may be required for these different peripheral devices. Several different interface circuits is not economical. This would conserve considerable space and power.

In addition, a processor is required to interface to a number of different peripheral devices. These peripheral devices have different data transfer rates and different timing. A solution to this problem is to design, simulate and test a unique interface circuit for each peripheral. This requires physical space for each of the circuits as well as being wasteful of components, power and design effort.

Accordingly, it is an object of the present invention to provide a generic processor interface controller which eliminates marginal and different timings between a processor and a number of peripheral devices.

SUMMARY OF THE INVENTION

In accomplishing the object of the present invention, a novel processor interface controller is shown.

A processor system includes a system clock. The processor system also includes a processor which is coupled to a number of peripheral devices via a processor interface controller. The processor provides a number of control signals such as a read request signal, a write request signal and a data strobe signal.

The processor interface controller includes an enabling circuit which is connected to the processor. The enabling circuit operates in response to the data strobe signal to produce an enabling signal. A latching arrangement of the processor interface controller is connected to the system clock and to the enabling circuit. The latching arrangement operates in response to the system clock and to the enabling signal to produce an acknowledge signal at a predetermined time interval with respect to the enabling signal.

A read generator is connected to the processor, to the latching arrangement and to the peripheral devices. The read generator operates in response to the read request signal of the processor to the latching arrangement and to the peripheral devices and operates to produce a read signal for use by the peripheral devices. The read signal is produced at a predetermined time interval with respect to the enabling signal.

A write generator is connected to the processor, to the latching arrangement and to the peripheral devices. The write generator operates in response to the write request signal to produce a write signal at a predetermined time interval with respect to the enabling signal.

BRIEF DESCRIPTION OF THE DRAWINGS

FIG. 3 is a timing diagram of various control signals for the implementation of the present invention.

DESCRIPTION OF THE PREFERRED EMBODIMENT

Figure 1:
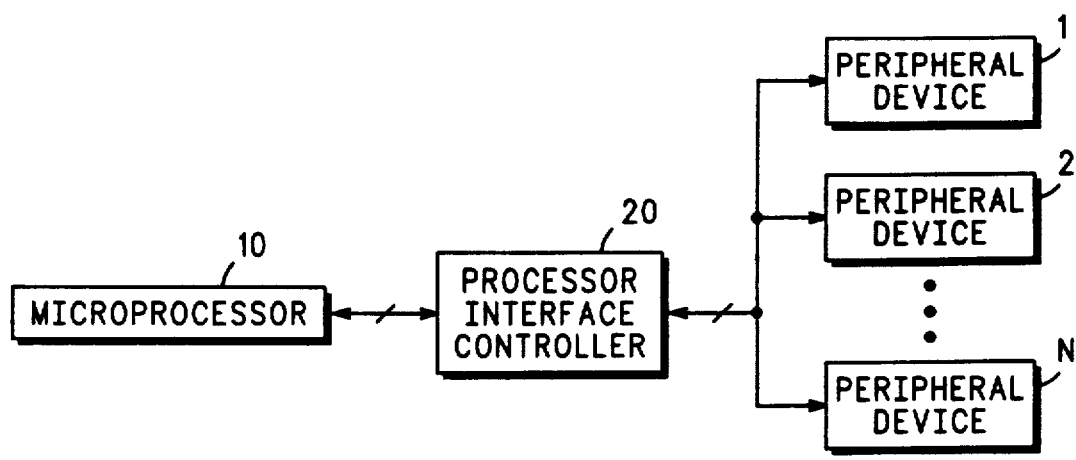
FIG. 1 is a block diagram of a microprocessor system including the present invention.

FIG. 1 is a block diagram of a microprocessor system. Microprocessor 10 is connected to processor interface controller 20 via address and data busses and a control bus including a number of control signals. Processor interface controller (PIC) 20 connects the address and data bus leads to each of the peripheral devices 1 through N. The address and data busses are passed through directly from the microprocessor to each of the peripheral devices 1 through N. Signals which indicate whether a peripheral device is to be read from or written to are transmitted from the microprocessor 10 to PIC 20. PIC 20 interprets the signals and provides the proper timing so that valid data is presented to microprocessor 10 by the particular peripheral device selected or vice versa. Specifically, individual read and write signals which are active low are required by a large majority of peripheral devices. In addition, the read and write signals have and extended (longer) pulse width which will meet the pulse width specifications of most of these peripheral devices. The RW signal from the microprocessor 10 is not active low for both read and write bus cycles and does not meet the pulse width requirement for most peripheral devices.

Select signals (not shown) which indicate the particular peripheral device to be written or read are transmitted directly from microprocessor 10 to each of the peripheral devices. When the appropriate select signal is initiated, the particular peripheral device indicated by that select signal will respond to the RD and WR signals.

Since different peripheral devices have different response and set up times, PIC 20 insures that the microprocessor will see valid data from any peripheral device which it selects and vice versa. Since the different peripheral devices have different setup and response times, stable data will be presented to the microprocessor or taken from the microprocessor at different times. The PIC 20 provides uniform timing between the microprocessor 10 and each of the peripheral devices 1 through N, while keeping the cycle time of the read or write operation to a minimum. Marginal timing is eliminated because the read pulse (RD) which is generated by the peripheral interface controller is of an extended length which allows the peripheral devices with slower response times to present valid data to the microprocessor within the required data setup time. During the write cycle, the peripheral interface controller generates a write pulse (WR) of an extended length to provide adequate data setup margins for the peripheral devices. Another feature is that the WR signal is clocked high on the rising edge of cycle S6 instead of going high during S7 as the UDS and LDS signals do. This provides additional data hold time for the peripheral devices because of inadequate data hold times provided by the microprocessor.

The PIC 20 may be implemented within an integrated circuit. PIC 20 may be implemented on an ASIC (Application Specific Integrated Circuit) along with some of the internal peripheral devices and other circuitry. These internal peripheral devices may include memories. Different timing problems result from having peripheral devices located within the same ASIC circuit and from those peripheral devices located external to the ASIC circuit such as tape or disk drives. All data transfers between the microprocessor 10 and peripheral devices 1 through N are performed with the same bus timing. As a result, the amount of circuitry required is minimized. In addition, simulation of such ASIC circuitry is significantly facilitated.

Figure 2:
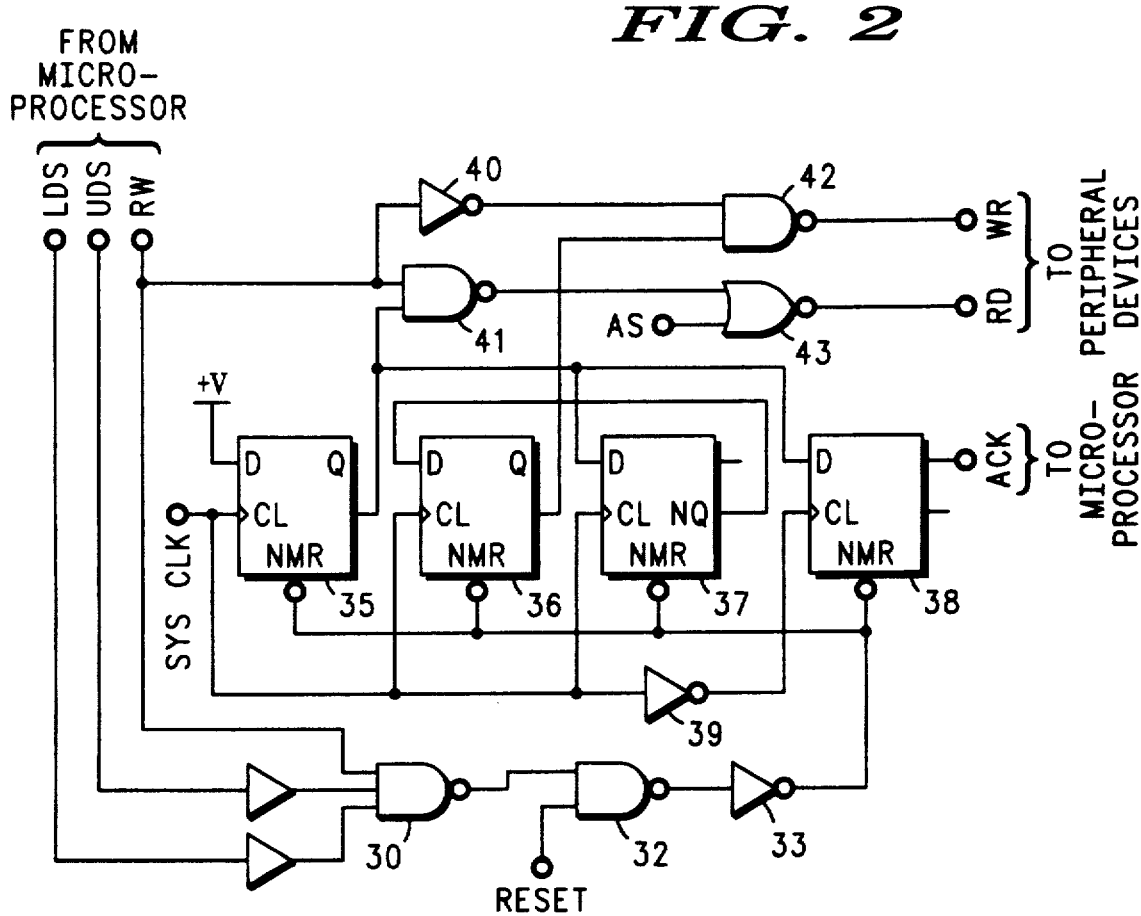
FIG. 2 is a schematic diagram of an embodiment of the present invention.

Referring to FIG. 2, a schematic diagram of PIC 20 of FIG. 1 is shown. The read/write signal RW connects microprocessor 10 to NAND GATE 30, NAND GATE 41 and inverter 40. The upper data strobe (UDS) and the lower data strobe (LDS) connect microprocessor 10 through corresponding buffers to inputs of NAND GATE 30. The read/write signal and the upper data strobe and lower data strobe signals are a portion of the control bus which connects microprocessor 10 to PIC 20. The read/write signal, upper data strobe and lower data strobe signals are all active upon transition from the high logic level to the low logic level (i.e., from logic 1 to logic 0).

The RESET signal is connected from the microprocessor 10 to an input of NAND GATE 32. The system clock signal SYSCLK is also connected from microprocessor 10 to the clear input of D-type flip-flops 35, 36, 37 and through inverter 39 to flip-flop 38.

The output of NAND GATE 30 is connected to another input of NAND GATE 32. The output of NAND GATE 32 is connected to inverter 33. The output of inverter 33 is connected to the NMR inverting input of D-type flip-flops 35 through 38. The D input of flip-flop 35 is connected to a voltage source of logic 1 (+V). The Q output (control signal) of flip-flop 35 is connected to an input of NAND GATE 41 to send the read signal to the peripheral devices, to the D input of flip-flop 37 and to the D input of flip-flop 38. The NQ (not Q) output of flip-flop 37 is connected to the D input of flip-flop 36.

The Q output (control signal) of flip-flop 36 is connected to an input of NAND GATE 42 to send the write signal to the peripheral devices. The Q output of flip-flop 38 is the acknowledge signal ACK. The acknowledge signal ACK is transmitted back to the microprocessor in response to a read or write request. In the case of a read request, the acknowledge signal indicates that stable data has been presented by the peripheral device and it may be read by the microprocessor. In the case of a write request, the acknowledge signal indicates that stable data has been received by the particular peripheral device. The acknowledge signal is responsible for the longer (extended) pulse widths of the read (RD) and write (WD) signals because the processor signals LDS, UDS, and RW re held at their asserted (active low) levels until the acknowledge signal is recognized by the microprocessor. Since acknowledge signal is not generated until after the falling edge of cycle S4 (see FIG. 3), the processor extends (or waits) its bus cycles and tnerefore its bus signals UDS, LDS, and RD by the minimum number of wait states (W1 and W2) and therefore the peripheral interface controller generates longer (extended) read (RD) and write (WR) pulse widths. Latches 35-38 cause processor 10 to wait for the acknowledge signal the minimum number of wait states.

The output of inverter 40 is connected to an input of NAND GATE 42. The output of NAND GATE 41 is connected to an input of NOR GATE 43. The address strobe signal is transmitted to the other input of NOR GATE 43. The address strobe signal AS indicates that the particular address on the address bus (not shown) is stable. The address strobe AS is generated by the microprocessor and is one of the control signals of the control bus.

The output of NAND GATE 42 is the write signal. This signal is transmitted to each of the peripheral devices. One particular peripheral devices is selected. The selected peripheral device respond to this write signal by transferring data from the data bus (not shown) and writing it into the particular peripheral device.

The output of NOR GATE 43 is the read signal RD. The read signal RD is transmitted to the peripheral devices 1-N and indicates that the selected peripheral device is to place its data on the data bus and this data is to be read into the microprocessor. As can be seen, a single circuit handles a number of peripheral devices, thereby achieving great economy.

Referring now to FIGS. 2 and 3 taken in combination, the description of the processor interface controller is explained. The system clock signal SYSCLK is shown at the top of FIG. 3 waveform 100. The clock is shown passing through states S0 through S4, to wait states W1 and W2 and states S5 through S7. The system clock is generated by the clock circuit included in microprocessor 10 which is not shown. On the falling edge of state S2 an address strobe signal AS, upper data strobe UDS and lower date strobe LDS are produced by transition from the logic 1 to logic 0 state as shown by waveform 101 of FIG. 3. The RW signal waveform 108, determines read signal RD and write signal WR. During state S4, either the read signal RD or the write signal WR is produced. These signals indicate read and write functions by microprocessor 10 respectively. The read function will be explained first.

When the UDS and LDS signals (generated by the microprocessor) are at a logic 1, the flip-flops are disabled from accepting inputs from being clocked and therefore cannot change state. When the RESET signal makes a transition from logic 1 to logic 0, flip-flops through 35 through 38 are cleared and disabled. When the UDS and LDS signals are applied to NAND GATE 30 and the read/write signal from the microprocessor is applied to NAND GATE 30, a logic 1 is input to flip-flops 35 through 38 via the NMR input. This causes flip-flips 35 through 38 to become active in response to the system clock signal SYSCLK. Since the D input of flip-flop 35 is at logic 1, the Q output of flip-flop 35 outputs a logic 1. The output of flip-flop 35 and the read/write signal RW are combined by NAND GATE 41 and a logic 1 will be output from NAND GATE 41 to NOR GATE 43. The output of NOR GATE 43 is the read signal RD. The RD signal is shown as waveform 102 of FIG. 3. This occurs on the rising edge of state S4.

The Q output of flip-flop 35 is transmitted to the D input of flip-flop 38. Flip-flop 38 produces the acknowledge signal ACK. The acknowledge signal is generated after the failing edge of S4 and therefore the microprocessor extends its bus cycle by the minimum number of wait states W1 and W2. Only two wait states occur because the acknowledge signal is generated during the W1 wait state. Waveform 103 of FIG. 3 depicts this signal occurring during the wait state W1. From the time of W1 until the end of the cycle S7, the data on the data bus is stable and may be read by the microprocessor 10. This is depicted in waveform 104 of FIG. 3, which shows the data signals D0 through D15. At the end of the cycle, state S7, the processor then returns to state S0.

The write cycle is shown by the waveforms 105-107 of FIG. 3. The operation of the address strobe signal AS, reset signal RESET, UDS and LDS, and system clock signal SYSCLK, are as described above for the read operation. The output of flip-flop 36 is obtained in response to the output of flip-flop 35, which is a result of flip-flop 37 The output of flip-flop 37 is the input to flip-flop 36 and enables the output of flip-flop 36, which is transmitted to NAND GATE 42. With the read/write signal RW inverted by inverter 40, NAND GATE 42 produces a logic 0 on the WR lead as shown by waveform 106 of FIG. 3. This signal is transmitted to the particular peripheral device which is to be written to. The data bus D0 through D15 is then stable for this writing process as shown by waveform 107 of FIG. 3.

Figure 4:
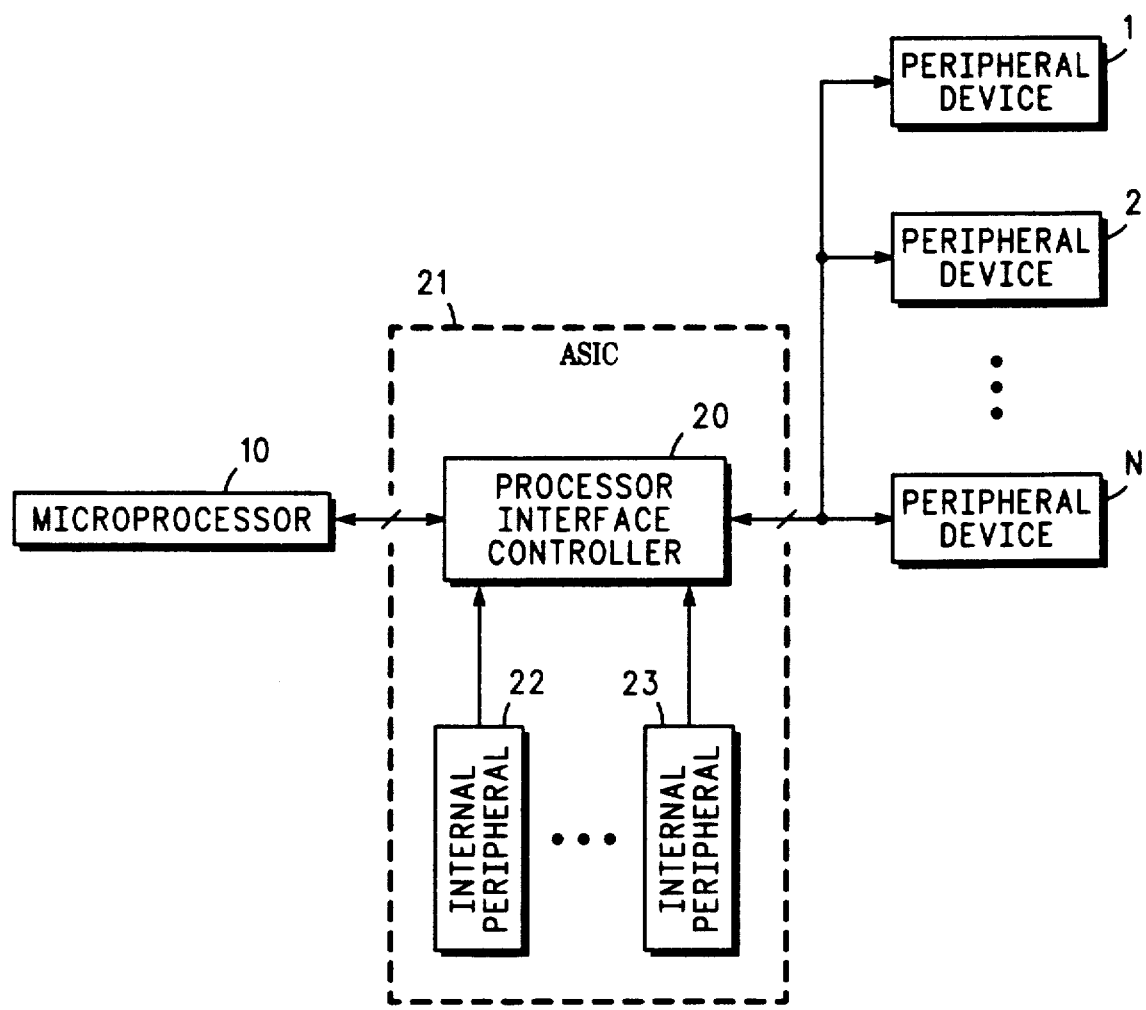
FIG. 4 is a block diagram of a microprocessor system including an alternate embodiment of the present invention.

FIG. 4 is a block diagram depicting application specific integrated circuit (ASIC) 21 which includes a processor interface controller 20 and internal peripheral devices 22-23. These internal peripheral devices may be memories, for example.

It can be seen that a novel processor interface controller is shown which introduces a minimum number of wait states to achieve data transfer between a microprocessor and a number of peripherals.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a processor system including a system clock, a processor coupled to a plurality of peripheral devices via a plurality of busses, a processor interface controller comprising:
   one of said plurality of busses including a data strobe signal from said processor and a read/write request signal indicating one of a read request and a write request by said processor;
   enabling means connected to said processor via said one of plurality of busses, said enabling means operating in response to said data strobe signal of said processor to produce an enabling signal after a particular time interval from the time of receipt of said data strobe signal;
   latching means connected to said system clock and to said enabling means, said latching means operating in response to said system clock and to said enabling signal to produce an acknowledge signal at a predetermined time interval from the time of receipt of said enabling signal;
   said latching means further producing first and second control signals, said first and second control signals being produced in response to said system clock and to said enabling signal and said first and second control signals delaying transmission of said read/write request signal to said peripheral devices;
   read generating means connected to said processor via said one of plurality of busses, to said latching means and to said peripheral devices, said read generation means operating in response to said read/write request signal and said first control signal to produce a read signal for transmission to said plurality of peripheral devices;
   write generation means connected to said processor via said one of plurality of busses, to said latching means and to said peripheral devices, said write generation means in response to said read/write request signal and said second control signal to produce a write signal for transmission to said plurality of peripheral devices; and
   said latching means producing said acknowledge signal in response to said first control signal thereby introducing a minimum number of wait states into said processor cycle to read valid data from a selected peripheral device when said read/write request signal indicates a read request and "to write valid data to a selected peripheral device" when said read/write request signal indicates a write request.

2. A processor interface controller as claimed in claim 1, wherein there is further included:
   said data strobe signal including first and second data strobe signals transmitted from said processor to said processor interface controller; and
   first gating means connected to said processor and operating in response to said first and second data strobe signals and to said read/write request signal to provide a strobe output signal.

3. A processor interface controller as claimed in claim 2, wherein there is further included:
   said processor further operating to provide a reset signal via said one of a plurality of busses, said reset signal for resetting said latching means;
   said enabling means including;
   second gating means connected to said first gating means and to said processor, said second gating means operating in response to said reset signal and to said strobe output signal to produce said enabling signal; and
   first inverting means connected to said second gating means and operating to provide a first value of said enabling signal in response to a corresponding second value of said strobe output signal.

4. A processor interface controller as claimed in claim 3, said latching means including:
   first latching means connected to said system clock and to said first inverting means, said first latching means operating in response to a first value of said enabling signal to produce said first control signal of a first value for operating said read generation means;
   second latching means;
   third latching means connected to said first latching means, to said first inverting means, to said system clock and to said second latching means, said third latching means operating in response to said first control signal to produce a third control signal of a second value for operating said read generation means;

said second latching means connected to said first inverting means and to said system clock, said second latching means operating in response to said third control signal to produce a second control signal of a first value;

said enabling signal, said first control signal, said second control signal and said third control signal each having at least first and second values; and fourth latching means connected to said first latching means, to said first inverting means and to said system clock, said fourth latching means operating in response to said first control signal to produce said acknowledge signal.

5. A processor interface controller as claimed in claim 4, wherein there is further included second inverting means connected between said system clock and said fourth latching means, said second inverting means for inverting said system clock prior to input to said fourth latching means.

6. A processor interface controller as claimed in claim 4, said read generation means including third gating means connected to said processor and to said first latching means, said third gating means operating in response to said read/write request signal and to said first control signal to produce an intermediate read signal.

7. A processor interface controller as claimed in claim 6, wherein said read generation means further includes:

said processor operating to provide an address strobe signal via said one bus;

fourth gating means connected to said processor and to said third gating means, said fourth gating means operating in response to said intermediate read signal and to said address strobe signal to produce said read signal for transmission to said peripheral devices.

8. A processor interface controller as claimed in claim 7, wherein said write generation means includes third inverting means connected to said processor and operating in response to said read/write request signal to produce an intermediate write signal.

9. A processor interface controller as claimed in claim 8, wherein said write generation means further includes a fifth gating means connected to said third inverting means and to said second latching means, said fifth gating means operating in response to said second control signal and to said intermediate write signal to produce said write signal for transmission to said peripheral devices.

10. A processor interface controller as claimed in claim 9, said first gating means including NAND gating means.

11. A processor interface controller as claimed in claim 10, said second gating means including NAND gating means.

12. A processor interface controller as claimed in claim 11, wherein each of said latching means includes flip-flop means.

13. A processor interface controller as claimed in claim 12, wherein said third gating means includes NAND gating means.

14. A processor interface controller as claimed in claim 13, wherein said fourth gating means includes NOR gating means.

15. A processor interface controller as claimed in claim 16, wherein said fifth gating means includes NAND gating means.

16. A processor interface controller as claimed in claim 1, said processor interface controller comprising an Application Specific Integrated Circuit means.

17. A processor interface controller Application Specific Integrated Circuit (ASIC) including internal peripheral devices for use with a processor, including a system clock, connected to the internal peripheral devices and to external peripheral devices via a plurality of busses, said processor connected to said processor interface controller ASIC, said processor interface controller ASIC comprising:

one of said plurality of busses including a data strobe signal from said processor and a read/write request signal indicating one of a read request and a write request by said processor;

enabling means coupled to said processor via said one of plurality of busses, said enabling means operating in response to said data strobe signal of said processor to produce an enabling signal after a particular time interval from the time of receipt of said data strobe signal;

latching means coupled to said system clock and to said enabling means, said latching means operating in response to said system clock and to said enabling signal to produce an acknowledge signal at a predetermined time interval with respect to said enabling signal;

said latching means further producing first and second control signals, said first and second control signals being produced in response to said system clock and to said enabling signal and said first and second control signal delaying transmission of said read/write request signal to said peripheral devices;

read generation means connected to said processor via said one of plurality of busses, to said latching means and to said peripheral devices, said read generation means operating in response to said read/write request signal and said first control signal to produce a read signal for transmission to said plurality of peripheral devices;

write generation means connected to said processor via said one of plurality of busses, to said latching means and to said peripheral devices, said write generation means in response to said read/write request signal and said second control signal to produce a write signal for transmission to said plurality of peripheral devices; and said latching means producing said acknowledge signal in response to said first control signal thereby introducing a minimum number of wait states into said processor cycle to read valid data from a selected peripheral device when said read/write request signal indicates a read request and to write valid data to a selected peripheral device when said read/write request signal indicates a write request.

* * * * *

UNITED STATES PATENT AND TRADEMARK OFFICE
CERTIFICATE OF CORRECTION

PATENT NO. : 5,265,243
DATED : November 23, 1993
INVENTOR(S) : Richard M. Povenmire et al.

It is certified that error appears in the above-indentified patent and that said Letters Patent is hereby corrected as shown below:

Column 8, claim 17, line 38 change "signal" to --signals--.

Signed and Sealed this

Twentieth Day of September, 1994

Attest:

BRUCE LEHMAN

*Attesting Officer*     *Commissioner of Patents and Trademarks*